US 7,085,359 B2

(12) United States Patent
Crites et al.

(10) Patent No.: US 7,085,359 B2
(45) Date of Patent: Aug. 1, 2006

(54) INVESTIGATION AND REPORTING OF INMATE SECURITY THREATS

(75) Inventors: John G. Crites, Albuquerque, NM (US); Daniel Tor, Lawrenceville, GA (US); Christopher Gickler, Delaware, OH (US)

(73) Assignee: MCI, LLC, BaskingRidge, NJ (US)

( * ) Notice: Subject to any disclaimer, the term of this patent is extended or adjusted under 35 U.S.C. 154(b) by 390 days.

(21) Appl. No.: 10/325,839

(22) Filed: Dec. 23, 2002

(65) Prior Publication Data

US 2003/0126470 A1 Jul. 3, 2003

Related U.S. Application Data

(60) Provisional application No. 60/342,443, filed on Dec. 24, 2001.

(51) Int. Cl.
*H04M 15/00* (2006.01)
*H04M 3/22* (2006.01)

(52) U.S. Cl. ............. 379/112.01; 379/35; 379/133

(58) Field of Classification Search ......... 379/114.14, 379/93.01, 112.01, 133, 35, 106.02, 88.18, 379/88.19, 88.2, 88.21, 88.23, 88.25, 88.13, 379/88.08, 67.1
See application file for complete search history.

(56) References Cited

U.S. PATENT DOCUMENTS

| | | | | | |
|---|---|---|---|---|---|
| 5,535,261 | A | * | 7/1996 | Brown et al. | 379/88.11 |
| 6,052,454 | A | * | 4/2000 | Kek et al. | 379/188 |
| 6,064,963 | A | * | 5/2000 | Gainsboro | 704/270 |
| 2001/0036821 | A1 | | 11/2001 | Gainsboro et al. | |
| 2002/0071537 | A1 | * | 6/2002 | Gainsboro | 379/188 |

OTHER PUBLICATIONS

"TOSS Video Network Management, Inc. Announces New Product TC Reliance Video Visitation Manager 1.0", Press Release, Apr. 23, 2003, http://www.toddvnm.com/pr/042320032.htm.
"Conversational Voice-Access Solutions that Attract and Retain Customers: Correction Facilities", Web for Phone, http://www.webforphone.com/uses/corrections.asp.
"Application Examples", WG Systems, copyright 2001-2003 http://www.wgsystems.com.br/english/dc/wg_applic_exemp.htm#Corrections.
"Networked Multimedia Communication, Telejustice and Security Solutions", Vugate, http://www.vugate.com/index2.htm.
"Quality Turnkey Solutions from Experienced Telecommunication Professionals for All Your Video, Data, Voice, Security, Networking and Wireless LAN, MAN and WAN Applications", Telecom Engineering Consultants, copyright 2002, http://www.tec-inc.com.
"IVVIS", TEM Systems, Inc., copyright 2003, http://www.temsystems.com/inmate.htm.
"Video Visitation Voice Scheduling", TEM Systems, Inc., http://www.temsystems.com/inmate%20voice%20scheduling.htm.

* cited by examiner

*Primary Examiner*—Barry Taylor (57) ABSTRACT

A method and apparatus for providing inmate security threat group information includes correlating inmate identification records from a plurality of correctional facilities in a central database with call detail records from inmate telephone activities together with security threat group data comprising inmate affiliations and telephone numbers associated with security threats and security threat groups.

21 Claims, 6 Drawing Sheets

Security Threat Group Reporting System

Search Parameters

| | A | B | C | D | E | F | G | H | I |
|---|---|---|---|---|---|---|---|---|---|
| 1 | | | | | | | | | |
| 2 | Called Number | Date Range | | STG Code | Gang Level | Facility Code | Lock/Housing | Inmate | |
| 3 | | Beg Date--> | | | | | | Inmate ID--> | |
| 4 | BNA | End Date--> | | | | | | Last Name--> | williams |
| 5 | | | ☑ Ignore Date Range | | | | | | |
| 6 | | | ☑ Show Only Completed | | | | | | |
| 7 | | | ☑ Show Only Active Inmates | | | | | | |
| 8 | | | ☑ Show Attempted Calls Only | | | | | | |
| 9 | | | | | | | | | |
| 10 | SEARCH | DONE | 11 recs... | | | | | | |

Search Results

| | STG Code | Called Number | Facility | Inmate LastName | Inmate Number | State ID | Completed Call | Date | Time | Duration |
|---|---|---|---|---|---|---|---|---|---|---|
| 11 | | | | | | | | | | |
| 12 | | 4195362777 | ACI | WILLIAMS | 2237420 | OHDC | Yes | 10/20/2001 | 20:07:40 | 1440:40 Min:Sec |
| 13 | | 4195362777 | ACI | WILLIAMS | 2237420 | OHDC | Yes | 10/20/2001 | 13:34:31 | 0041:41 Min:Sec |
| 14 | | 4195362777 | ACI | WILLIAMS | 2237420 | OHDC | Yes | 10/24/2001 | 06:20:30 | 1419:19 Min:Sec |
| 15 | | 4195318780 | ACI | WILLIAMS | 2237420 | OHDC | Yes | 10/21/2001 | 12:09:35 | 1458:58 Min:Sec |
| 16 | | 4193992942 | ACI | WILLIAMS | 7138923 | OHDC | Yes | 09/20/2001 | 18:06:09 | 1442:42 Min:Sec |
| 17 | | 4192295687 | ACI | WILLIAMS | 2261778 | OHDC | Yes | 10/20/2001 | 16:32:30 | 1457:57 Min:Sec |
| 18 | | 3308899825 | ACI | WILLIAMS | 2211777 | OHDC | Yes | 10/23/2001 | 09:07:43 | 1422:22 Min:Sec |
| 19 | | 3308899825 | ACI | WILLIAMS | 2211777 | OHDC | Yes | 09/25/2001 | 08:54:57 | 1432:32 Min:Sec |
| 20 | | 3303993797 | BECI | WILLIAMS | 2406204 | OHDC | Yes | 09/25/2001 | 19:58:52 | 1431:31 Min:Sec |
| 21 | CRIP | 3135212615 | ACI | WILLIAMS | 2347431 | OHDC | Yes | 10/23/2001 | 18:50:52 | 1421:21 Min:Sec |

Fig. 3

|   | A | B | C | D | E | F | G | H |
|---|---|---|---|---|---|---|---|---|
| 1 |   |   |   | Search Parameters | | | | |
| 2 | Called Number | Date Range |   | STG Code | Gang Level | Facility Code | Lock/Housing | Inmate |
| 3 |   | Beg Date--> |   |   |   |   |   | Inmate ID--> |
| 4 | B N A | End Date--> |   |   |   |   |   | Last Name--> |
| 5 |   |   | ☑ Ignore Date Range |   |   |   |   |   |
| 6 |   |   | ☑ Show Only Completed |   |   |   |   |   |
| 7 |   |   | ☑ Show Only Active Inmates |   |   |   |   |   |
| 8 |   |   | ☑ Show Attempted Calls Only |   |   |   |   |   |
| 9 |   |   |   |   |   |   |   |   |
| 10 | SEARCH | D O N E | 11 recs... | Search Results | | | | |
| 11 | STG Code | Called Number | Facility | Inmate LastName | Inmate Number | State ID | Completed Call | Date |
| 12 |   | 3308895825 | ACI | WILLIAMS | 2211777 | OHDC | Yes | 10/23/2001 |
| 13 |   | 3308895825 | ACI | WILLIAMS | 2211777 | OHDC | Yes | 09/25/2001 |
| 14 |   | 4195362777 | ACI | WILLIAMS | 2237420 | OHDC | Yes | 10/20/2001 |
| 15 |   | 4195362777 | ACI | WILLIAMS | 2237420 | OHDC | Yes | 10/24/2001 |
| 16 |   | 4195362777 | ACI | WILLIAMS | 2237420 | OHDC | Yes | 10/20/2001 |
| 17 |   | 4195318780 | ACI | WILLIAMS | 2261778 | OHDC | Yes | 10/21/2001 |
| 18 |   | 4192295687 | ACI | WILLIAMS | 2342431 | OHDC | Yes | 10/20/2001 |
| 19 | CRIP | 3135212616 | BECI | WILLIAMS | 2406204 | OHDC | Yes | 10/23/2001 |
| 20 |   | 3303993797 | BECI | WILLIAMS | 2406204 | OHDC | Yes | 09/25/2001 |
| 21 | FOLKS | 2167917567 | BECI | WILLIAMS | 2406781 | OHDC | Yes | 10/23/2001 |

400

Print

Preview | ○ Landscape  ● Portrait | Print | ● Print All  ○ Print Selected

INVESTIGATION AND REPORTING OF INMATE SECURITY THREATS

RELATED APPLICATION DATA

This application is based on and claims the benefit of U.S. Provisional Patent Application Ser. No. 60/342,443, filed Dec. 24, 2001, incorporated herein by reference in its entirety.

FIELD OF THE INVENTION

An exemplary embodiment of the present invention relates in general to a method and system for information gathering, sorting and delivery, and in particular to a method and system for monitoring, investigating, correlating, identifying and reporting potential inmate security threats from the telephone call activities of inmates of one or more correctional facilities.

BACKGROUND

In recent years, many correctional facilities have extended liberal telephone privileges to inmates to promote community and family ties that contribute positively to inmates' personal development. In the interest of promoting wholesome family ties, hundreds of thousands of telephone calls are permitted to be made each day by inmates of correctional facilities. Unfortunately, serious abuse of the telephone system has been noted relating, in particular, to inmate participation in security threat group activity.

In response to the identification of a growing number of security threat group affiliated inmates in correctional facilities across the country, in recent years, a number of Department of Corrections facilities (DOCs) have attempted to identify, validate and certify street gangs and gang members who are incarcerated in their systems. The term Security Threat Group refers to group, alliance, gang or inmate organizations that have been determined to be acting in concert so as to pose a threat to the public, DOC staff, other inmates or to the orderly administration of a correctional institution. Inmate affiliation with a security threat group has been determined in a number of ways, such as by observing behavior, decoding graffiti, observing body markings, clothing arrangements, handshakes, and the like. Security threat group affiliation may also be identified by intelligence gathering concerning an inmate's associations with known security threat group members such as by monitoring the inmate's telephone calls.

Correctional facilities maintain control systems for processing inmate calls. Each time an inmate places a call from a correctional facility, a call detail record (CDR) of the call is created. The call detail records of inmate calls typically include the name of the inmate (and/or inmate identification number), the inmate's location, the number called and the date, time and duration of the call. Inmate call control systems may also include certain call monitoring facilities that enable correctional facility personnel to monitor and record inmate calls.

SUMMARY

Although correctional facilities have call processing platforms for monitoring and recording of inmate calls, and call detail records are maintained, these systems provide little help in effectively monitoring, tracking and correlating the expanding web of inmate security threat group activity. Given the limited resources for monitoring calls and the seriousness of the inmate telephone abuse problem, there is a need for a system and method that has the capability of identifying, tracking and correlating the telephone activities and calling patterns of inmates, and in particular, a system that is capable of establishing correlations of inmate calling activities from one correctional institution and system to another so that monitoring resources can best be utilized and inmate participation in security threat groups and other criminal activity can be thwarted.

An exemplary embodiment of the present invention addresses the foregoing problems, at least in part, as well as other problems, by providing a multi-institution security threat group information management system that includes a searchable database including inmate location and identity, inmate security threat group associations and inmate telephone call detail records.

BRIEF DESCRIPTION OF THE DRAWINGS

The above and other objects, features, and advantages of the invention will be apparent from the following more particular description of preferred embodiments of the invention, as illustrated in the accompanying drawings in which like reference characters refer to the same parts throughout the different views.

DETAILED DESCRIPTION

An exemplary embodiment of the present invention involves correlation of inmate security threat activities across institutional boundaries and allows the systematic identification of members of security threat groups by their telephone activities. Although specific embodiments will be illustrated and described herein, it will be appreciated by those of ordinary skill in the art that any arrangement, which is calculated to achieve the same purpose, may be substituted for the specific embodiment shown. This application is intended to cover any adaptations or variations of the present invention that generally relate to systems, methods, and an apparatus for gathering, correlating and providing security threat information from one or more locations.

In the following detailed description of the exemplary embodiments, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

Figure 1:
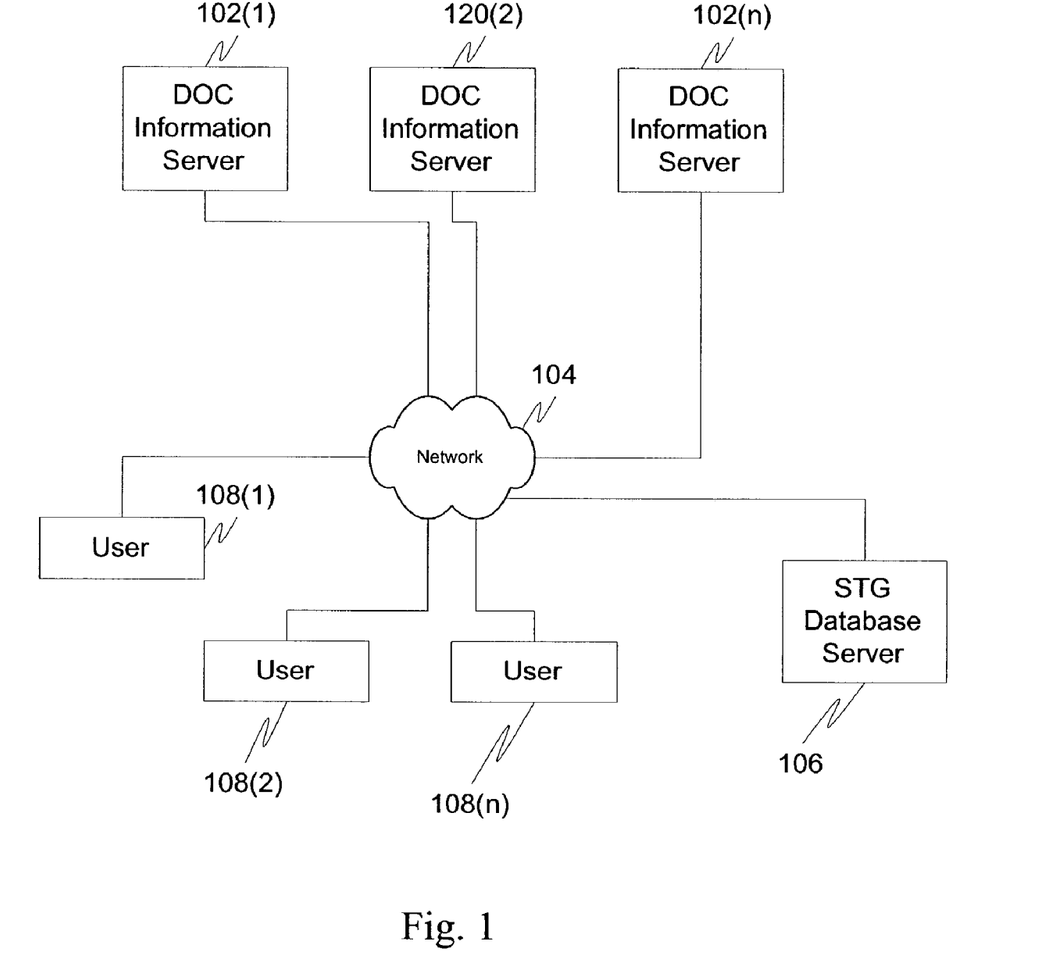
FIG. 1 shows a simplified high level view of one embodiment of a system architecture according to the present invention.

FIG. 1 shows a simplified high level view of an exemplary embodiment of a system architecture according to the present invention. DOC facility information servers 102(1), 102(2) to 102(n) gather and store information about inmates and security threat groups at correctional facilities. Each information server 102 is linked via a network, such as a private network 104, which may be a frame network, a secure internet link, or the like, to a central security threat group database server 106 where information from the various DOC facilities is collected and maintained. Central security threat group database server 106 may be accessed by users 108(1) to 108(n) via a link, such as a secure link, through the private network 104.

While the exemplary embodiments illustrated herein show the various components collocated, it is to be appreciated that the various components can be located at distant portions of distributed network, such as local area network, a wide area network, a telecommunications network, an intranet and/or the internet or within a dedicated system. Thus, it should be appreciated, that the various components can be combined into one or more devices or collocated on a particular node of a distributed network, such as telecommunications network. As will be appreciated from the following description, and for reasons of computational efficiency, the components can be arranged at any location within a distributed network without affecting the operation of the system.

Furthermore, it should be appreciated that the various links connecting the elements can be wired or wireless links or a combination thereof, or any other known or later developed element(s) that is capable of supplying and/or communicating data to and from the connected elements.

Additionally, it should be appreciated while various functional components are illustrated, various other components, such as switches, routers, long distance carriers, or the like, can also be included without affecting the operation of the system.

Also, while the systems and methods of this invention will be described in relation to a specific embodiment, it is to be appreciated that the system can be applied with equal success to other types of communications standards and protocols such as voice-over-packet, voice-over IP (VoIP), voice-over network, wired or wireless communications systems, such as mobile phone communications, PDA communications, or the like. In general, the systems and methods of this invention will work equally well with any communications system or protocol.

Furthermore, while the exemplary embodiments will be described in relation to inmates at a department of corrections, in general the systems and methods of this invention can be used with any demographic in any environment to monitor any type of electronic communication including, but not limited to telephone calls, e-mail, instant messaging, electronic chat, paging or the like.

Additionally, the term module as used herein can be any device, software or combination of hardware and software configured to perform at least one particular function.

Figure 2:
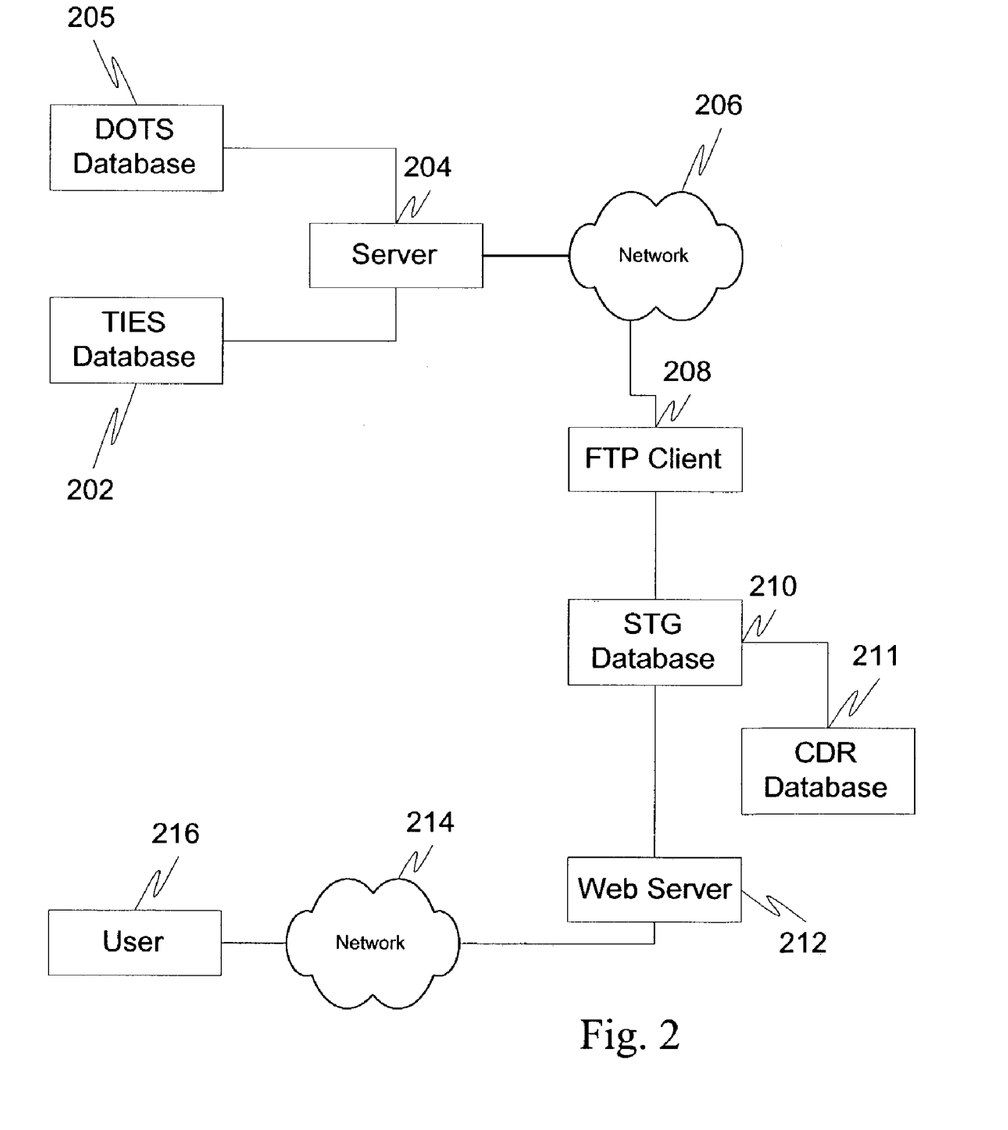
FIG. 2 shows a simplified but more detailed example of a system of FIG. 1, according one embodiment of the present invention.

FIG. 2 shows a simplified but more detailed example of the system of FIG. 1, according to an exemplary embodiment of the invention. This example illustrates a single database system for a single department of corrections (the State of Ohio DOC). It should be understood however that any number of state and/or federal DOC facilities with similar databases and systems may be included in a system according to the present invention.

The Department Offender Tracking System (DOTS) database 205, is a database of known gang information and affiliations. It is maintained by the DOC and provides information about security threat group and inmates known to be affiliated with security threat groups. In general, this database only provides historical information about proven security threat group affiliations and does not contain information about suspected security threat group affiliations or possible ties to a security threat group. The TIES database 202 includes information about all of the inmates of a DOC facility, including information such as inmate Personal Identification Numbers (PIN), housing unit, lock, and the like. Both databases are updated frequently as information concerning inmates changes and inmates move in and out of the correctional facility.

An exemplary embodiment of the present invention establishes a central data warehouse for uploading, storing and organizing information, such as the data in the TIES database 202 and DOTs database 205, which has been obtained from correctional facilities in any number of locations nationally, or internationally. The data can be correlated, compared, retrieved and sorted based on user input or on a predetermined search, sort and correlation criteria. In one example, information from TIES database 202 and DOTS database 205 is downloaded on a regular basis, for example, every day, to, for example, a file transfer protocol (FTP) server such as the DOCs FTP server 204. The DOCs FTP server 204 transmits the data to a communications provider FTP client 208 via a network 206, such as a private frame relay network. Communications provider FTP Client 208 downloads the data files received from the FTP server 204 and provides the data file to a central security threat group database server 210. The data is then combined and used to update the security threat group database server 210.

The security threat group database server 210 updates the security threat group database with the information it has received from the FTP client 208. In addition, the security threat group database server 210 obtains and stores Customer Detail Records or Call Detail Records (CDRs) for inmates from the DOC facilities covered by the system from one or more CDR databases 211 and attempts to determine whether there are correlations. Some of the correlations may be determined automatically. For example, an inmate who has been associated with a security threat group may have some or all of his telephone calls tagged as calls possibly related to the SECURITY THREAT GROUP. The system may be programmed to automatically record the names of all inmates who call a telephone number that has been associated with a particular SECURITY THREAT GROUP. Other correlations and associations may be determined automatically or performed manually by an investigative query of the database. The correlations and investigations can be performed, for example, on a facility by facility basis, or can be performed between facilities on a global scale to determine call patterns related to security threat groups.

In addition, other correlation and associations may be investigated and determined with the present invention. For example, an inmate may be engaged in an unauthorized communication with prison guards or other employees that may pose a security threat to the institution. Using the present invention, a database of telephone numbers of DOC employees, contractors and other persons engaged in business on the DOC premises, for example, may be rapidly compared with inmate telephone activities to determine whether an inmate may be calling any such persons.

In another example, 3 way calls, which are not permitted to be made by inmates, have been initiated by outside callers to enable inmate security threat group members to communicate by telephone. The system of the present invention will easily detect and tag instances of inmates calling the same outside telephone number at the same time and thus detect a conference call initiated by an outside caller.

An exemplary embodiment of the present invention includes a secure web based interface that may be accessed through, for example, a private frame relay network or other secure network, that links one or more central systems to end user locations, typically department of corrections (DOC) facilities, prisons or other law enforcement investigative facilities. The secure web based interface requests a user name and password for access.

An exemplary embodiment of the present invention includes a search engine that uses input from the user and searches a database that includes historical CDRs in a telephone service provider's data warehouse. The database is combined and correlated with information obtained from the law enforcement and DOC security threat group and criminal activities databases. If the information that is input by the user is found in the database, then the search engine will return the results in, for example, a spreadsheet format such as Microsoft® Excel®. The search can return any correlations between inmate telephone activity and known security threat groups or, for example, just that inmate's telephone activity data.

The user can have, for example, an ICON on the desktop of a workstation. The user will click on the ICON in order to access the present invention. The user will input his/her user name and password for access. Once in the present invention, the user can input known information into the data search fields and research correlations between inmates on a large scale.

Operation of Exemplary Embodiment

A security threat group database application running on the security threat group DB web server 212 retrieves information from the security threat group database 210 based on user input from, for example, a query module, a remote user workstation 216. The remote user workstation 216 communicates with the security threat group database web server 212 over a network 214, such as a private internet or frame relay network, which may be the same or a different network as the network 206.

In one example, an investigator will receive intelligence about possible inmate participation in criminal activity. Such information may include a tip from an informant, information obtained from monitoring a phone call, inmate mail, or other intelligence sources. The information may be specific to a particular inmate or may be general and involve as yet unspecified inmates such as the location of a crime or an unidentified security threat group activity. Examples of such intelligence may include inmate security threat group affiliation, pending or prior drug deals, murder, extortion, or the like.

Additionally, for example, queries can be automated and based on, for example, a profile, where for example, inmates with known security threat potential can be monitored more closely than other inmates.

Action

If the intelligence triggers investigation of a single inmate, the investigator uses the DOC call processing platform to see who that inmate has been calling. In addition, the investigator may listen to one or more calls, since all inmate calls are recorded and logged. If the investigator determines further investigation is warranted, the investigator may use the security threat group database to determine other inmate activity in connection with the phone number(s) that the inmate is calling. While making a query the investigator can also display the following:

1) How many other inmates are or have been calling the numbers that the specific inmate is calling, who they are, and where they are located;
2) What, if any, is their security threat group affiliation, or what security threat group affiliation may be discovered from the recorded telephone calls;
3) Whether there are inmates from other correctional facilities calling this same number and whether those inmates have known security threat group affiliations.

With this information, an investigation can familiarize themselves with the other inmates and/or parties who are calling that number, if there are any. If the other inmates are in other prisons, the local investigation can prompt a state-wide or facility-wide investigation. The investigation may also need to bring in other state and Federal authorities. If there are no other inmates calling that number, the investigation would likely remain local to the facility.

If a security threat group correlation is discovered, close attention to the activities of that security threat group can be paid, whatever the scale of their reach may be, i.e. facility, state, national, international. The other states' DOC investigators can be contacted and information can be shared, in order to apprise them of the suspected security threat group activity so that other investigations can be initiated as well. No matter how the investigator receives his initial intelligence, the process of the present invention will be essentially the same. The access to this information and the scale of correlation may well lead to the discovery of very large criminal organizations and activity that could prove invaluable to the security of the prison facilities, public safety, and perhaps even national security.

Data structures in the present invention are organized to facilitate data maintenance and exchange and are also designed to be extensible and flexible to accommodate additional data. In order to provide a coherent structure for data, the present invention provides general source data format templates. In one example, the file format includes the following:

Header Record (Comma-Separated)
Hmmddyyyy, hhmmss, Contract_Name
Where,
H—>Header Record indicator.
mmddyyyy—>Month Day Year.
Hhmmss—>Hour Minute Second. This information will should be used if there are more than one files in a day.
Contract_Name—>As assigned by the communications provider Trailer Record (Comma-Separated)
Tmmddyyyy, Contract_Name
Where,
T—>Trailer Record.
mmddyyyy—>Month Day Year.
Contract_Name—>Assigned by communications provider Security Threat Group Detail Record (Comma-Separated)
DInmate_Number, Pin, First_Name, Last_Name, STG Code, GangLevel, Facility_Code, Location
Where,
D—>Detail record indicator
Inmate_Number—Right-justified (0s in the beginning if required) inmate id Pin—Inmate PIN
First_Name—Inmate's first name
Last_Name—Inmate's last name
STG Code—Affiliated security threat group Code
GangLevel—Inmate's level in security threat group
Facility_Code—Facility code representing the facility that inmate is currently housed in. This code will be assigned by the communications provider in consultation with DOCs
Location—Inmates location in prison.

The example below shows data organized in a file format according to the above template:
H06252001, 190800, FLDC
D2131214, 0625,John Doe, WHISU,D1,LOCI,127B
T06252001, FLDC In the example above, the date is Jun. 25, 2001, the time is 19:08:00, and the contract name is FLDC. The inmate number is 2131214, the inmate's pin is 0625, his first name is John, and his last name is Doe. The STG code is WHISU, gang level is D1, facility code is LOCI, and the location is 127B. While comma separators have been used in the above example, any other character or separator mechanism can be used to separate the data, as would be known to those of ordinary skill.

Security Threat Group Database Maintenance

In order to keep the database current, the DOCs will send updates to the security threat group database to the communications provider on a regular basis, e.g., a DOC uploads the data file to an FTP server each day. The communications provider will then download the data file and use it to keep the security threat group database current.

The present invention also provides for data transport of the security threat group data files. Data transport mechanisms are platform-independent. Examples of some of the mechanisms used would be FTP, SMTP, HTTP. Other transport mechanisms may be used depending on the systems in use at the DOCs.

Security threat group Query and Reporting Interface

An exemplary embodiment of the present invention implements security for authentication and authorization. This insures that only registered users with authentic username/password combinations can access the system. Further, through a multi-tiered authorization scheme, a specific process or person may only access or modify data that he has been authorized to process. For example, a user from Ohio may not, unless authorized, view and/or modify security threat group information from Florida.

Login Screen

The user interface begins with a login screen (not shown) where the user enters a username and a password. The username and password are used to authenticate the user and to set the access level to view security threat group information.

Search Screen

Figure 3:
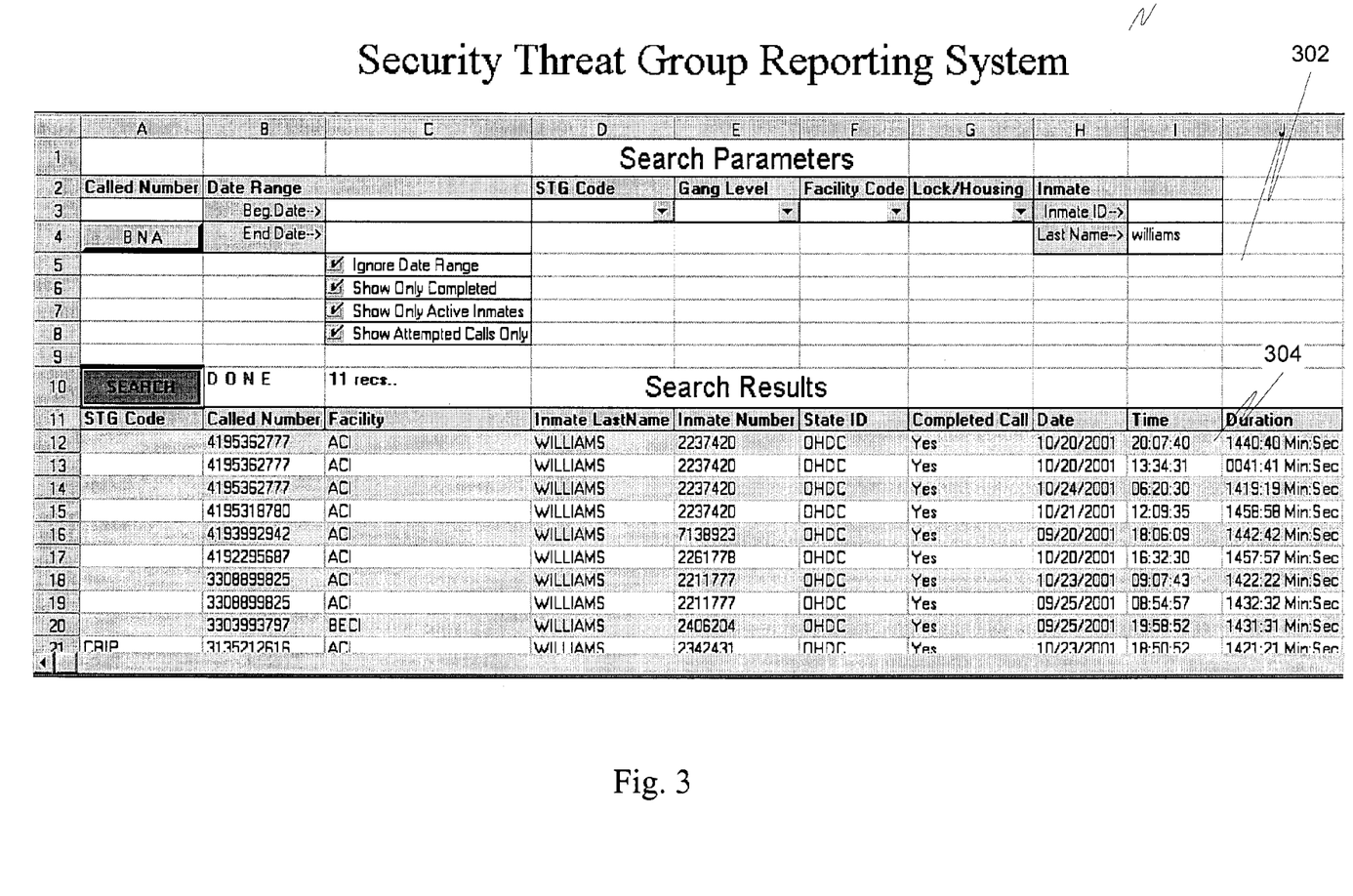
FIGS. 3–4 are exemplary user interfaces for displaying search parameters and search results according one embodiment of the present invention.

The login screen leads to the search screen. FIG. 3 illustrates an exemplary user search screen 300. The user search screen 300 has 2 sections, a search parameter section 302 to enter search parameters to filter the query, and a search result section 304 to display the query results. When multiple parameters are entered, the records in the result set match the parameters specified.

Representative search parameters are described below. The search parameters may be used alone or in conjunction with other search parameters:
Beginning and End Dates—Queries may be limited to records within a certain date range such as calls made during the specified date range.
Called Number (ANI)—A field that enables a user to search for records of calls made to a specified phone number. If a user searches a particular called number, the report will show all inmates who have been calling that number.
STG Code—A field that enables a user to search for all inmates making calls to a telephone number or a name of a person that has been associated with that security threat group code.
Gang Level—Show all inmates that have this gang level.
Lock/HU—Show all inmates that belong to this Lock/Housing unit.
Facility Code—Show all inmates from this facility.
Inmate ID—Show all calls made by this inmate.
Last Name—Show all calls made by inmates with this last name.

Additionally, the user may filter the query by checking the items such as the following:
Ignore a specified date range
Show only completed calls
Show only active inmates
Show attempted calls only.

A representative search result will provide search results in, for example, a spreadsheet, such as Excel®, having a number of fields or columns such as the following:
security threat group Code
Called Number (ANI)
Facility
Inmate Last Name
Inmate Number or PIN
State ID
Completed Call (Y/N)
Call Date
Call Time
Call Duration.

Each column has a sort capability so that once the search results have been retrieved, the user may sort the result set by any one or more of the result fields. For example, results could be sorted by security threat group codes and then further sorted by inmate State ID. A billing name and address (BNA) could be displayed with the called number. Alternatively, a BNA button could be placed next to the called number field so that the user could click to display the BNA data on the called number, if desired.

Figure 4:
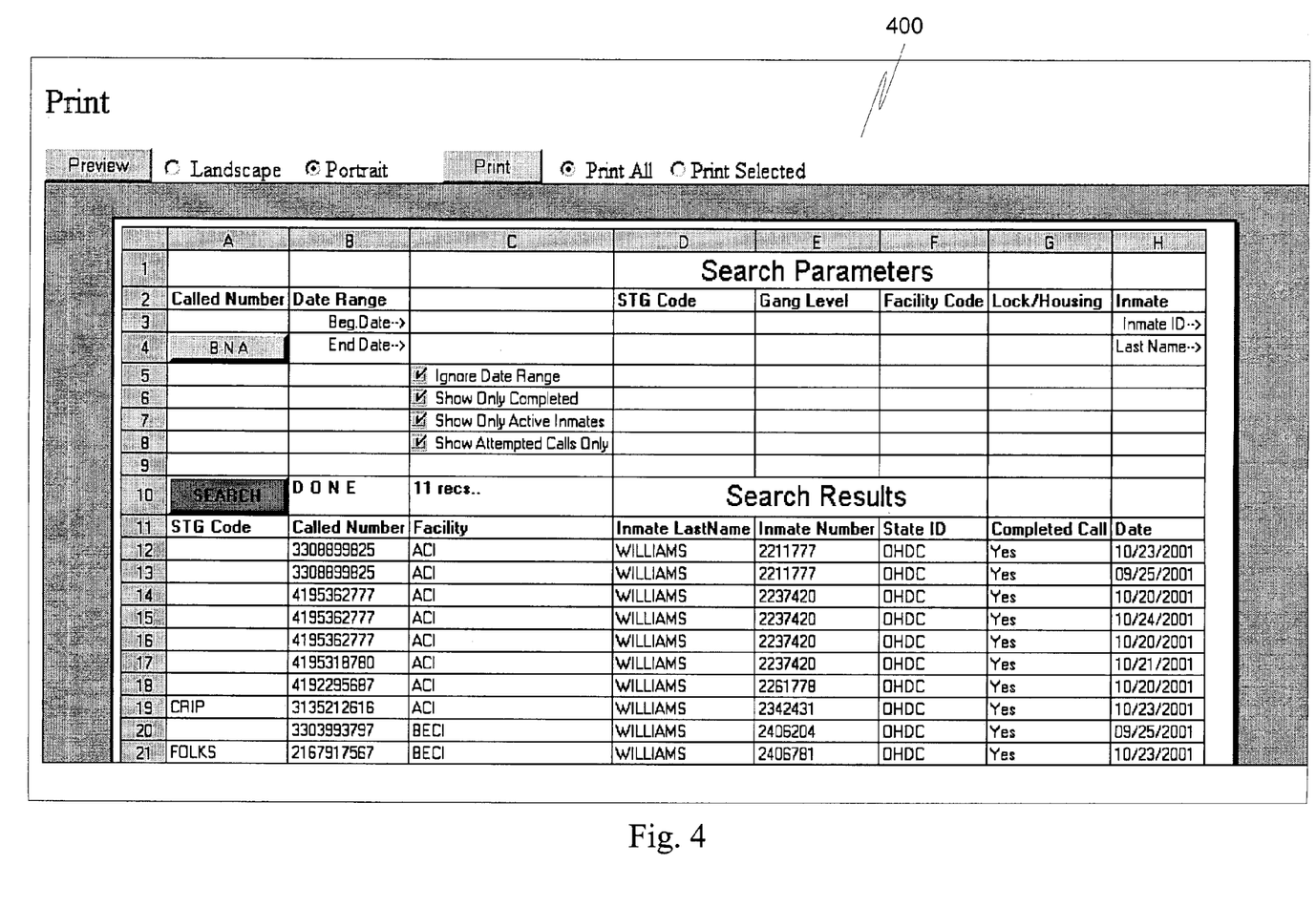

The user may print the results if desired, store the result set for later use or electronically transmit the results to, for example, another investigator. For example, FIG. 4 illustrates an exemplary user interface 400 that provides printing option for printing the results of a search.

Authentication

Security is an extremely important consideration for the security threat group database. In order to prevent unauthorized access to the SGT system, the system will enforce the use of a username/password, or comparable combination such as fingerprint, retinal scan, or the like. Only users who are duly identified will be permitted to access the system. User registration will be administered by an administrator and not the user.

Authorization

The system will restrict each user's access to system resources based on the user's identity, established by the username/password combination. The system's authorization scheme is implemented through the use of access levels. The basic levels of access are explained below:

Home Access

Each DOCs will have home access to its own security threat group information, and each user of the system will be registered with a DOCs as their home DOCs. Registered users will have full viewing access to their home DOCs security threat group information.

Co-Op Access

Each DOCs may have a list of other DOCs with whom security threat group information is shared. Users of the system may only have full viewing access to security threat group information for DOCs on their home DOCs' co-op list. This means that each user will have a co-op list, which is a subset of their home DOCs' co-op list. This will enable the user to view all or some security threat group data from the home DOCs co-op list.

One exemplary embodiment of a system according to the present invention implements role-base security with the minimum number of roles to include Super Admin, System Admin, Home Admin, and Home User. These roles are described below:

Super Admin Group
  This group may:
Define and add new groups to the system
Perform all other group functions described below.

System Admin Group
This group may:
View security threat group information from all DOCs.
Fully administer the entire system. Functions include, adding new user to any DOCs, removing users, updating co-op list for DOCs, adding new users to System Admin and Home Admin Groups.

Home Admin Group
This group may:
Fully administer the settings for home DOCs (except for adding a user to the Home Admin group and updating DOCs co-op list). Functions include Adding a new home user, removing home user and updating home user co-op list.
Perform all functions of the home user.

Home User
Can fully view security threat group information for home DOCs and DOCs on co-op list.
Can not perform any administrative function.

Third Party Components and Technologies

Various commercially available components and technologies may be used in connection with the present invention. Representative components are categorized below:

Database Components
MICROSOFT® SQL SERVER OLEDB DRIVER
MICROSOFT® ACTIVEX DATABASE OBJECT LIBRARY
MICROSOFT® SQL SERVER 2000

Web Technology
MICROSOFT® INTERNET INFORMATION SERVER 5 (IIS 5)
MICROSOFT® ACTIVEX COMPONENT TECHNOLOGY Operating System
MICROSOFT® WINDOWS 2000 SERVER User Interface Components
FARPOINT SPREAD 3.5
FARPOINT SPREAD 3.5 PRINT PREVIEW The exemplary graphical user interfaces shown in FIGS. 3 and 4 are used to enter search parameters for running a filtered query against the security threat group data. The results can then be printed or stored.

Figure 5:
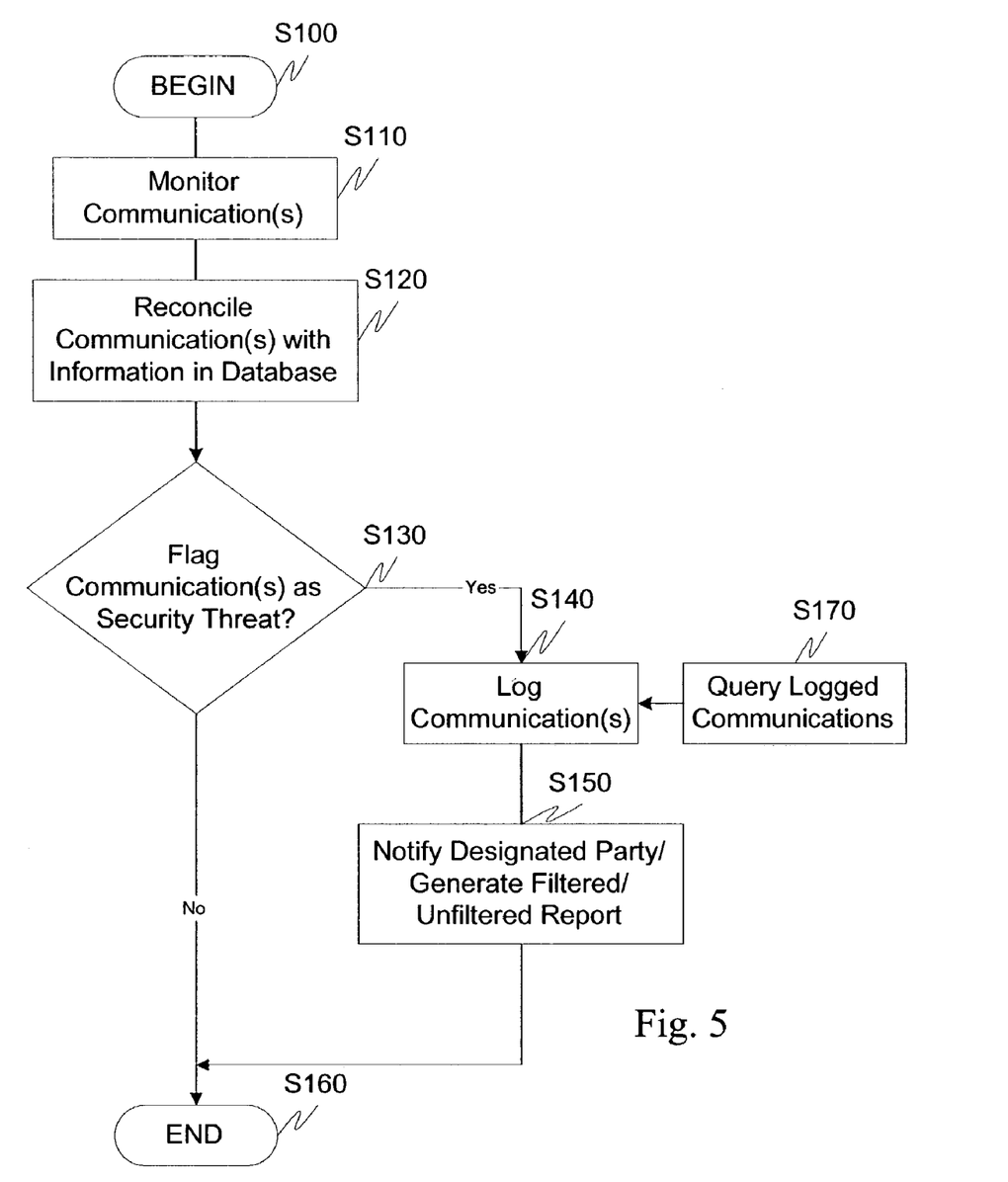
FIGS. 5–6 are flowcharts illustrating exemplary methods for reconciling communications information with security threat information according to this invention.

FIG. 5 illustrates an exemplary method of determining a security threat according to this invention. In particular, control begins in step S100 and continues to step S110. In step S110, one or more communications are monitored. Next, in step S120, information regarding the monitored communications is reconciled with information in a security threat database. Then, in step S130, a determination is made whether the monitored communications meet the qualifications for being flagged as a security threat. If the communications are identified as a security threat, control continues to step S140. Otherwise, control jumps to step S160 where the control sequence ends.

In step S140, information associated with the suspect communications are logged. Next, in step S150, for example, a designated party is notified of the potential security threat, and/or a filtered or unfiltered report is generated. Control then continues to step S160 where the control sequence ends.

At any time, a user, after logging in, may also query the database in step S170 to, for example, to search for specific information regarding an existing or potential security threat. The results of this query can then, for example, be exported in a report in step S150.

Figure 6:
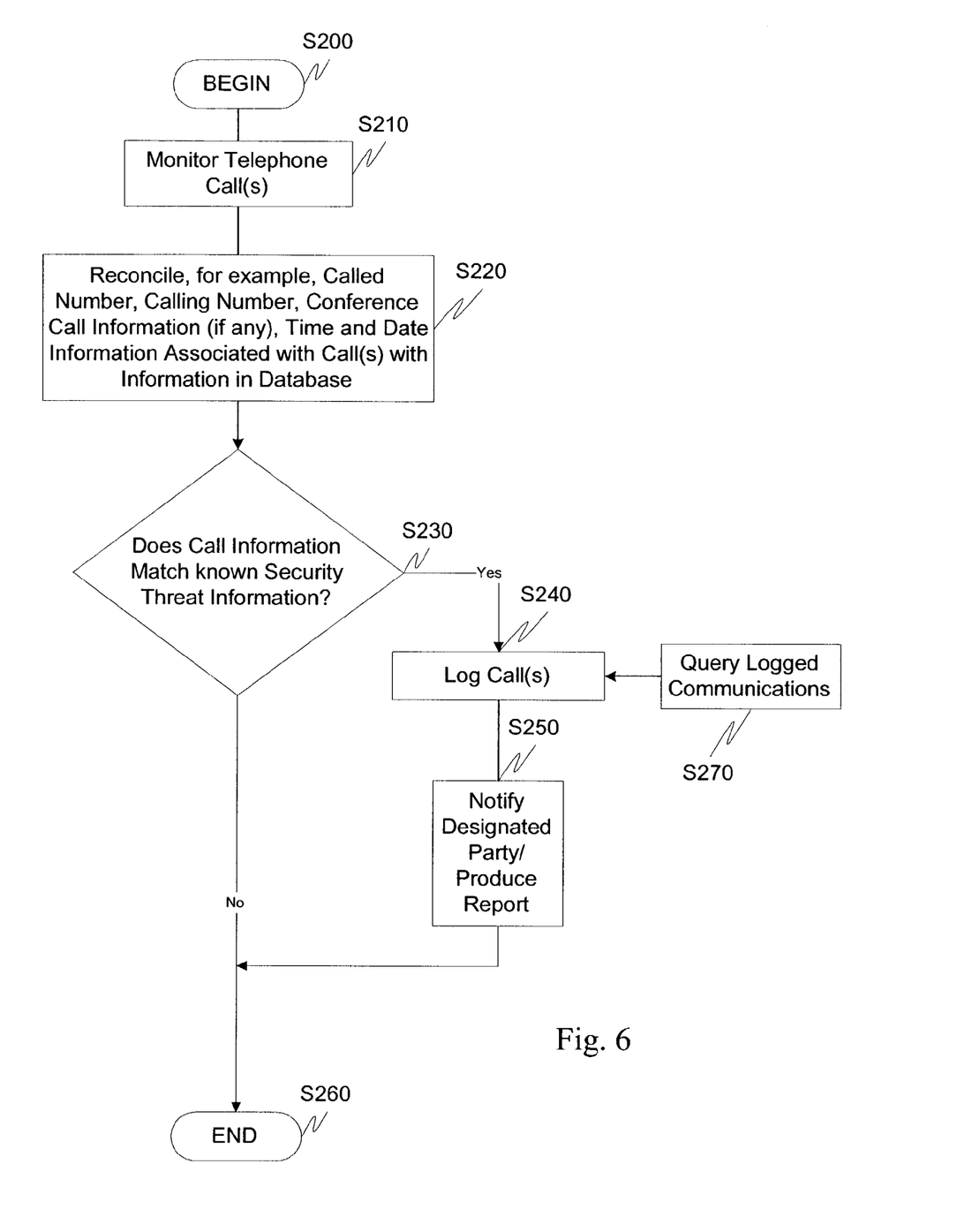

FIG. 6 illustrates an exemplary method of determining a security threat based on telephone calls according to this invention. In particular, control begins in step S200 and continues to step S210. In step S210, one or more telephone calls are monitored.

Next, in step S220, information regarding the monitored telephone calls, such as called number, calling number, conference call Information (if any), time and date information associated with call(s), and the like, is reconciled with information in a security threat database. Then, in step S230, a determination is made whether the monitored telephone calls meet the qualifications for being flagged as a security threat. If the telephone calls are identified as a security threat, control continues to step S240. Otherwise, control jumps to step S260 where the control sequence ends.

In step S240, information associated with the suspect telephone calls are logged. Next, in step S250, for example, a designated party is notified of the potential security threat, and/or a filtered or unfiltered report is generated. Control then continues to step S260 where the control sequence ends.

Additionally, as discussed above, at any time, a user, after logging in, may also query the database in step S270 to, for example, to search for specific information regarding an existing or potential security threat. The results of this query can then, for example, be exported in a report in step S250.

As illustrated in the figures, the security threat tool can be implemented either on a single programmed general purpose computer, a separate programmed general propose computer, or a combination thereof. However, the security threat tool can also be implemented on a special purpose computer, a programmed microprocessor or microcontroller and peripheral integrated circuit element, an ASIC, or other integrated circuit, a digital signal processor, a hard-wired electronic or logic circuit, such as discrete element circuit, a programmable logic device, such as a PLD, PLA, FPGA, PAL or the like. In general, any device capable of implementing a state machine that is in turn capable of implementing the flowcharts illustrated herein can be used to implement the security threat tool according to this invention.

Furthermore, the disclosed method may be readily implemented in software using an object or object-oriented software development environment that provides source code that can be used on a variety of computer, server, or workstation hardware platforms.

Alternatively, the disclosed security threat tool may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer and telecommunications systems being utilized. The security threat tool however, can be readily implemented in hardware and/or software using any know or later developed systems or structures, devices and/or software by those of ordinary skill in the applicable art from the functional description provided herein, and with a general basic knowledge of the computer and telecommunications arts.

Moreover, the disclosed methods may be readily implemented as software executed on a programmed general purpose computer, a special purpose computer, a microprocessor, or the like. In these instances, the methods and systems of this invention can be implemented as a program embedded in a telecommunications system, such as JAVA® or CGI script, as a resource residing on a server or graphics workstation, as a routine embedded on a dedicated security threat system, or the like. The security threat tool can also be implemented by physically incorporating the system into a software and/or hardware system such as the hardware and software system of a server and associated interface device.

It is, therefore, apparent that there has been provided, in accordance with the present invention, security threat tool. While this invention has been described in conjunction with a number of illustrative embodiments, it is evident that many alternatives, modifications, and variations would be or are apparent to those of ordinary skill in the applicable arts. Accordingly, the disclosure is intended to embrace all such alternatives, modifications, equivalents and variations that are within in the spirit and scope of this invention.

We claim:

1. A method for identifying telephone call activities that pose potential security threats, comprising:
    storing first information regarding security threat groups;
    storing second information regarding inmates known to be affiliated with the security threat groups;
    storing call detail records associated with telephone calls to or from inmates associated with a correctional facility; and
    using the call detail records and the first and second information to identify telephone call activity associated with one of the security threat groups.

2. The method of claim 1, wherein storing first information includes:
    storing information regarding at least one of inmate organizations, inmate groups, inmate alliances, or gangs.

3. The method of claim 1, wherein the correctional facility includes a plurality of correctional facilities; and
    wherein using the call detail records and the first and second information includes:
    establishing correlations of inmate telephone calls between ones of the plurality of correctional facilities to identify telephone call activities associated with the security threat groups.

4. The method of claim 1, wherein the correctional facility includes a plurality of correctional facilities; and
    wherein storing the second information includes:
    storing information regarding inmates known to be affiliated with the security threat groups from the plurality of correctional facilities.

5. The method of claim 1, further comprising:
    storing third information regarding each inmate associated with the correctional facility; and
    wherein using the call detail records and the first and second information includes:
    identifying telephone call activity associated with one of the security threat groups based on an analysis of the call detail records against the first, second, and third information.

6. The method of claim 1, further comprising:
    regularly updating the first and second information.

7. The method of claim 1, further comprising:
    automatically recording a name of an inmate who calls a telephone number determined to be associated with one of the security threat groups.

8. The method of claim 1, wherein using the call detail records and the first and second information includes:
    determining telephone calls from an inmate who is associated with one of the security threat groups, and
    tagging the determined telephone calls as telephone calls possibly related to the one of the security threat groups.

9. The method of claim 1, further comprising:
    storing a database of telephone numbers associated with persons doing business at the correctional facility; and
    analyzing the call detail records against the database to identify telephone call activity between an inmate and one of the persons doing business at the correctional facility as a potential security threat.

10. The method of claim 1, wherein using the call detail records and the first and second information includes:
    determining instances where two or more inmates call a same telephone number outside the correctional facility at a same time, and
    tagging the determined instances as potential conference telephone calls related to one of the security threat groups.

11. The method of claim 1, wherein using the call detail records and the first and second information includes:
    determining instances where two or more inmates call a same telephone number outside the correctional facility, and tagging the determined instances as telephone calls possibly related to one of the security threat groups.

12. A system for identifying telephone call activity associated with a potential security threat, comprising:
means for storing information regarding security threat groups and inmates known to be affiliated with the security threat groups;
means for storing call detail records associated with telephone calls to or from inmates associated with a plurality of correctional facilities; and
means for identifying a telephone call activity associated with one of the security threat groups based on the stored information and the stored call detail records.

13. A computer-readable medium that stores instructions executable by at least one processor, comprising:
instructions for storing first information regarding security threat groups;
instructions for storing second information regarding inmates known to be affiliated with the security threat groups;
instructions for storing communication detail records associated with electronic communications to or from inmates associated with a correctional facility; and
instructions for analyzing the communication detail records against the first and second information to identify electronic communication activity associated with one of the security threat groups.

14. A system, comprising:
a memory to store:
information regarding security threat groups and inmates known to be affiliated with the security threat groups, and
communication detail records associated with communications to or from inmates associated with a plurality of correctional facilities; and
an analysis module to analyze the communication detail records against the information regarding security threat groups and inmates known to be affiliated with the security threat groups to identify communication activity associated with one of the security threat groups.

15. The system of claim 14, wherein the information regarding security threat groups includes information regarding at least one of inmate organizations, inmate groups, inmate alliances, or gangs.

16. The system of claim 14, wherein the analysis module is configured to establish correlations of inmate communications between ones of the plurality of correctional facilities to identify communication activities associated with the security threat groups.

17. The system of claim 14, wherein the analysis module is configured to:
determine communications from an inmate who is associated with one of the security threat groups, and
tag the determined communications as communications possibly related to the one of the security threat groups.

18. The system of claim 14, wherein the memory is further configured to store information regarding persons doing business at the correctional facilities; and
wherein the analysis module is configured to identify communication activity between an inmate and one of the persons doing business at one of the correctional facilities as a potential security threat.

19. The system of claim 14, wherein the analysis module is configured to:
determine instances where two or more inmates call a same telephone number outside the correctional facilities at a same time, and
tag the determined instances as potential conference telephone calls related to one of the security threat groups.

20. The system of claim 14, wherein the analysis module is configured to:
determine instances where two or more inmates communicate with a same number outside the correctional facilities, and
tag the determined instances as communications possibly related to one of the security threat groups.

21. The system of claim 14, wherein the communications include at least one of telephone calls, electronic mail transmissions, or instant message transmissions.

* * * * *